United States Patent [19]

Ducharme

[11] Patent Number: 4,552,766
[45] Date of Patent: Nov. 12, 1985

[54] METHOD OF DRYING AND SALTING FISH

[75] Inventor: Marcel Ducharme, New Glasgow, Canada

[73] Assignee: Inno-Tech Developments Ltd., Ottawa, Canada

[21] Appl. No.: 396,116

[22] Filed: Jul. 7, 1982

[51] Int. Cl.⁴ ............................ A23B 4/02; F26B 3/00
[52] U.S. Cl. .......................................... 426/294; 34/9; 426/332; 426/465; 426/643
[58] Field of Search ............... 426/289, 294, 331, 332, 426/643, 465, 467, 472; 34/9; 118/20

[56] References Cited

U.S. PATENT DOCUMENTS 3,239,942  3/1966  Mink et al. ........................... 426/332

OTHER PUBLICATIONS

Bulletin No. 112, "The Processing of Dried Salted Fish" published by the Fisheries Research Board of Canada, Ottawa, 1957.
CA Selects–Fluidized Solids Technology, Issues 19 and 22-26, 1981.

Primary Examiner—George Yeung
Attorney, Agent, or Firm—Banner, Birch, McKie & Beckett

[57] ABSTRACT

A method and apparatus for the salting and drying of cleaned and prepared fish, or for the drying of salted fish, by means of a fluidized bed of salt particles suspended within heated and dried air. Split fish, fish fillets, shaped portions of minced fish or whole fish are placed in apertured enclosures which are suspended within a chamber in which a fluidized salt bed has been established, and are conveyed through the fluidized salt bed across the interior of the chamber and exposed to the fluidized salt bed until the desired degree of drying and salting of the fish has been achieved.

19 Claims, 2 Drawing Figures

METHOD OF DRYING AND SALTING FISH

BACKGROUND OF THE INVENTION

This invention relates to method and apparatus for the drying of relatively large pieces of food by immersing them in an air fluidized bed in which the suspended material is a granulated or powdered edible or non-toxic substance approved for use in association with foodstuffs. More particularly, the invention relates to method and apparatus for the simultaneous salting and drying of relatively large pieces of food (particularly fish and meat) by their immersion in an air fluidized bed of salt particles.

In the fish processing industry, current methods for preparing dried salted fish involve a number of separate steps which require days or even weeks to be carried out.

In the method most commonly used in the industry today, the fish to be processed are first cleaned, and then split or filleted prior to salting. The conventional process as well as that of the present invention is applicable to split fish, fish fillets, or portions of minced fish, but the following description will refer throughout to the handling of split fish.

In the typical conventional method of preparing salt fish, washed and drained split fish are first salted by hand. If a heavy salt fish is desired, alternating layers of fish and salt may be set out on flat surfaces such as pallets ("kench pickling") or, alternatively, the split fish may be covered with salt in a container and left to generate their own brine in a self-pickling process called "pickle cure". A minimum of three weeks is involved in this first stage in the preparation of heavy salt fish, during which period the fish naturally undergoes a "denaturation" or curing which is significant in achieving the ultimate desired taste of the product.

The preparation of light salt fish is conducted in the same manner as the pickle cure, but less salt is used and less time is allowed to elapse, typically five to six days, before proceeding to the next stage of processing. The next step in any of the aforesaid conventional fish salting processes is the washing of the split fish and allowing them to drain, a process known in the art as "waterhorsing". The split fish are then set out to dry on horizontal drying trays in a mechanical dryer, typically for twenty to twenty-four hours at a maximum temperature of 85° F. The split fish are then press piled in order to equalize moisture distribution throughout the pieces of fish, whch vary considerably in thickness and, hence, rate of drying. After press piling, the conventional process for the salting of fish typically involves a further stage of heating at similar elevated temperatures in the mechanical dryer for a further twenty to twenty-four hours or more, followed by further press piling and, finally, weighing and packing of the dried salt fish product.

The known methods of preparing salt fish have drawbacks and disadvantages beyond the length of time required to obtain a suitable product, which can vary from about one week to several weeks. The known methods are manually oriented and are labour intensive. Each stage of the process requires workers to salt the fish, pack them, place them within mechanical dryers, and so on. The expenditure of time and labour adds to the cost of the finished product. Further, the prolonged exposure of the fish to ambient conditions at various stages of the process can result in spoilage and loss due to bacterial contamination.

It is evident that the combination and acceleration of some of the stages in the process of preparing salt fish is highly desirable in achieving financial savings through a more rapid turnover in inventory and the reduction of the labour input. However, any apparatus or process to achieve these goals must result in a commercially acceptable final product, preferably having the appearance and taste of that obtained by conventional methods.

The apparatus and process of the present invention eliminates a number of stages and a considerable portion of the time and labour entailed in conventional fish salting methods, while producing a salt fish product which is comparable to traditional light salted fish. According to the process of the invention, washed and drained split fish are put in racks which are immersed within a fluidized salt bed in a chamber for a period of only twelve to twenty-four hours, subsequently press piled once to render the remaining moisture content uniform throughout the fish, and then weighed and packed.

The salting and drying process which takes place within the fluidized salt bed effects a moisture content reduction from an initial content of about 70 percent, to a reduced value of about 42 to 45 percent, characteristic of the final moisture content of salt fish conventionally produced. However, in the conventional process this moisture reduction requires at least several days of salting, followed by two separate drying stages. Under the process of the present invention, the moisture transfer out of the fish may take place entirely during a single period of exposure to the fluidized salt bed, in which the transfer of salt into the fish is simultaneously effected. Further, the drying rate may be enhanced to an even greater degree in comparision to conventional methods, in that a higher ambient temperature may be used within the fluidized bed chamber than in the conventional mechanical dryers by reason of the greater rate of evaporation which takes place from the surface of the fish and the consequent lowered local temperature at the fish surface. Effective exposure times of about one-third as long as the post-salting period of drying in conventional dryers used in the traditional process have been achieved. Too, a considerably lower volume flow rate of heated dried air is required through the chamber of the present invention as compared with the flow rate of drying air in the conventional fish dryer, thereby further reducing the expenses of processing.

SUMMARY OF THE INVENTION

In one of its aspects, the present invention is a method of drying portions of solid food in which a gas fluidized bed of a particulate edible drying agent suspended in a gaseous working fluid is first established and portions of solid food are immersed within the fluidized bed to effect the desired drying of the food. The humidity of the working fluid is monitored at locations across the bed to follow the progress of drying and the temperature and volume flow of working fluid through the fluidized bed is controlled during the period of immersion of the portions of solid food within the bed. After a predetermined period of exposure of the portions of solid food to the fluidized bed, when a desired degree of moisture removal has taken place, the dried portions of solid food are removed from the fluidized bed.

In a particular aspect of the method of the present invention, a fluidized bed of salt particles suspended in a gaseous working fluid is established, and pieces of solid food are immersed into the fluidized salt bed while the humidity of the working fluid at locations across the bed and the temperature and volume flow of the working fluid through the bed are controlled, to achieve a desired condition of salting and/or drying of the pieces of solid food, whereupon they are removed from the fluidized salt bed.

The invention is also directed to a method of drying and salting fish in the form of split fish, fish fillets, shaped portions of minced fish, or whole fish, or drying wet pre-salted split fish or fish fillets, comprising the steps of washing and draining the fish and wrapping them in a water-permeable fabric material, then arranging the wrapped fish one next to another in apertured enclosures which permit salt particles within a fluidized bed of salt particles to impinge on a substantial portion of the surface of the wrapped fish when an apertured enclosure holding wrapped fish is immersed within the fluidized salt bed. A fluidized bed of salt particles in a gaseous working fluid is established within a chamber operative to receive a series of such apertured enclosures at one end of the chamber for vertical suspension of the apertured enclosures within the fluidized bed, the chamber being provided along its interior with means for horizontally advancing apertured enclosures suspended within the chamber through the fluidized bed to the other end of the chamber, where the apertured enclosures may be successively removed from the chamber. A first apertured enclosure containing wrapped fish is suspended within the chamber at one end and is advanced through the chamber sufficiently to permit the suspension of a second apertured enclosure within the chamber. A series of apertured enclosures is successively suspended within the chamber at one end thereof until the chamber is fully charged with apertured enclosures containing wrapped fish. These enclosures are maintained within the chamber until the desired degree of treatment of the fish has been achieved, whereupon the first enclosure that was suspended within the chamber is removed and the remaining enclosures suspended within the chamber are advanced one position towards the end of the chamber from which enclosures are removed. In this manner, containers are successively removed from the chamber in the same order as they were introduced into the chamber, so that each enclosure of wrapped fish undergoes a similar degree of treatment within the fluidized salt bed in the chamber.

It is a further aspect of this invention to provide apparatus for drying, or drying and salting solid food, comprising a horizontally elongated chamber, including a horizontal bottom wall provided with means for directing a diffuse flow of air upwardly through the bottom wall to suspend salt particles within the chamber in the state of a fluidized bed, impelling means for the introduction of air into the chamber through the directing means of the bottom wall, a cover overlying the top of the chamber provided with venting means to allow the flow of air through the fluidized bed to be exhausted from the chamber, controlled heating means for adjusting and maintaining the temperature of air introduced into the chamber by the impelling means, pressure control means for maintaining the flow of air through the chamber within a range over which the salt particles within the chamber possess the properties of a fluidized bed, a plurality of apertured enclosures for holding pieces of solid food in the chamber while exposing them to the salt particles within the fluidized bed, and carrier means mounted within the chamber operable to suspend the apertured enclosures therein and to move them along the length of the chamber through the fluidized salt bed.

Advantageously, the apparatus of the present invention may further include air drying equipment, such as a heat pump, having an intake port for receiving ambient or re-circulated air, an outlet port in communication with the intake of the impelling means so that air dried by the air drying equipment is impelled into the chamber through the bottom wall thereof, and a recycling port in communication with the venting means of the cover and in communication with the air drying equipment. Although the apparatus shown in the drawings and described in detail below uses impelling means which comprises a compressor on the intake side of the chamber, a person skilled in the art will understand that this may be replaced or supplemented by a suction-type device located on the exhaust side of the chamber.

Optionally, the apparatus of the present invention may also include an ozone generator for the addition of ozone to the air introduced into the chamber wherein the fluidized bed of salt particles is established.

In the apparatus of the present invention, the carrier means mounted within the chamber for suspending apertured enclosures and moving them along the length of the chamber through the fluidized salt bed may comprise a pair of parallel roller chains mounted along the interior faces of opposed long side walls of the chamber near the top edges thereof and power means operatively connected to the roller chains for horizontally moving apertured enclosures suspended therefrom. In the apparatus of the present invention, designed for the drying, or drying and salting of fish, the apertured enclosure used for fish to be dried and salted within the chamber may be a foldable rack operable to retain fish in parallel arrangement disposed generally perpendicularly to the direction of motion of such racks along the length of the chamber through the fluidized salt bed within the chamber, each foldable rack comprising a pair of similar rectangular frames, each perimetral to and integral with a sheet of mesh material, the frames being hingedly interconnected along one pair of corresponding sides so that the frames may be swung apart to allow the arrangement of fish on one of the sheets of mesh material and then swung together to a closed position for enclosing fish between the sheets of mesh material, locking means for holding the frames of each rack together in the closed position and support members projecting outwardly from the frames of the rack with the roller chains of the carrier means.

The method and apparatus of the present invention may be successfully and advantageously employed not only in the drying and salting of fish in the form of split fish, fish fillets, shaped portions of minced fish, or whole fish, but also in the drying of wet fish which has been pre-salted, e.g. by prolonged immersion in brine.

These and other features of the invention are described hereinafter in the detailed description of embodiments of the invention taken in conjunction with the drawings.

DESCRIPTION OF THE PREFERRED EMBODIMENT

Figure 1:
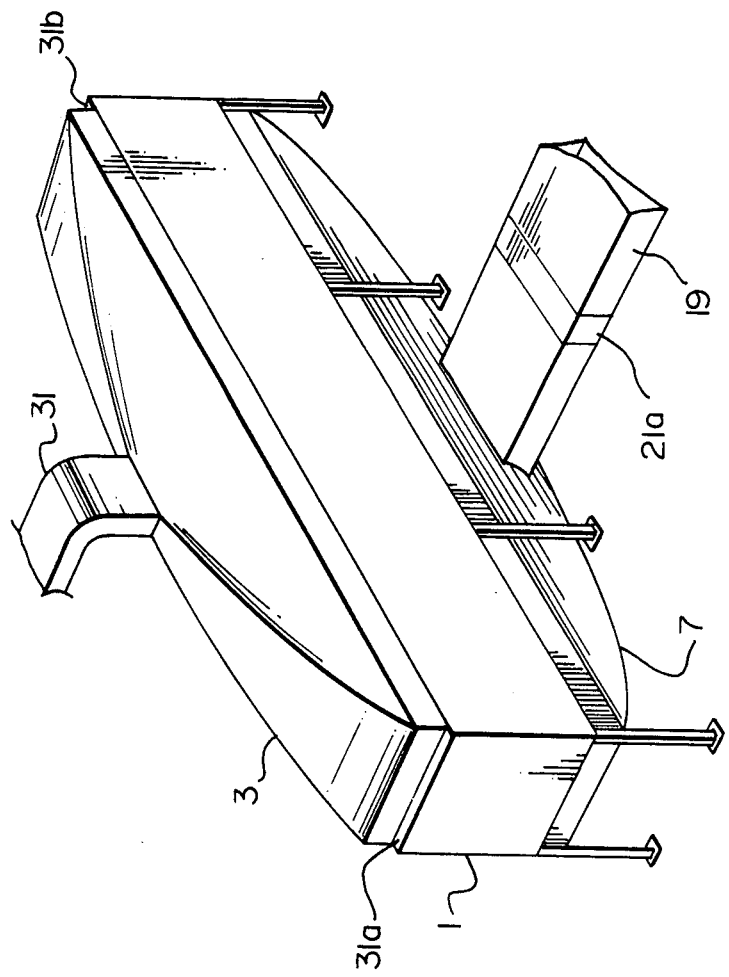
FIG. 1 is a partial perspective view of the apparatus of the present invention, showing the chamber within which the fluidized salt bed is established and the immediate inlet and outlet means for working fluid passing through the chamber.

As shown in the drawings, the dryer unit of the present invention comprises an elongated chamber 1 surmounted by a convex cover 3.

Figure 2:
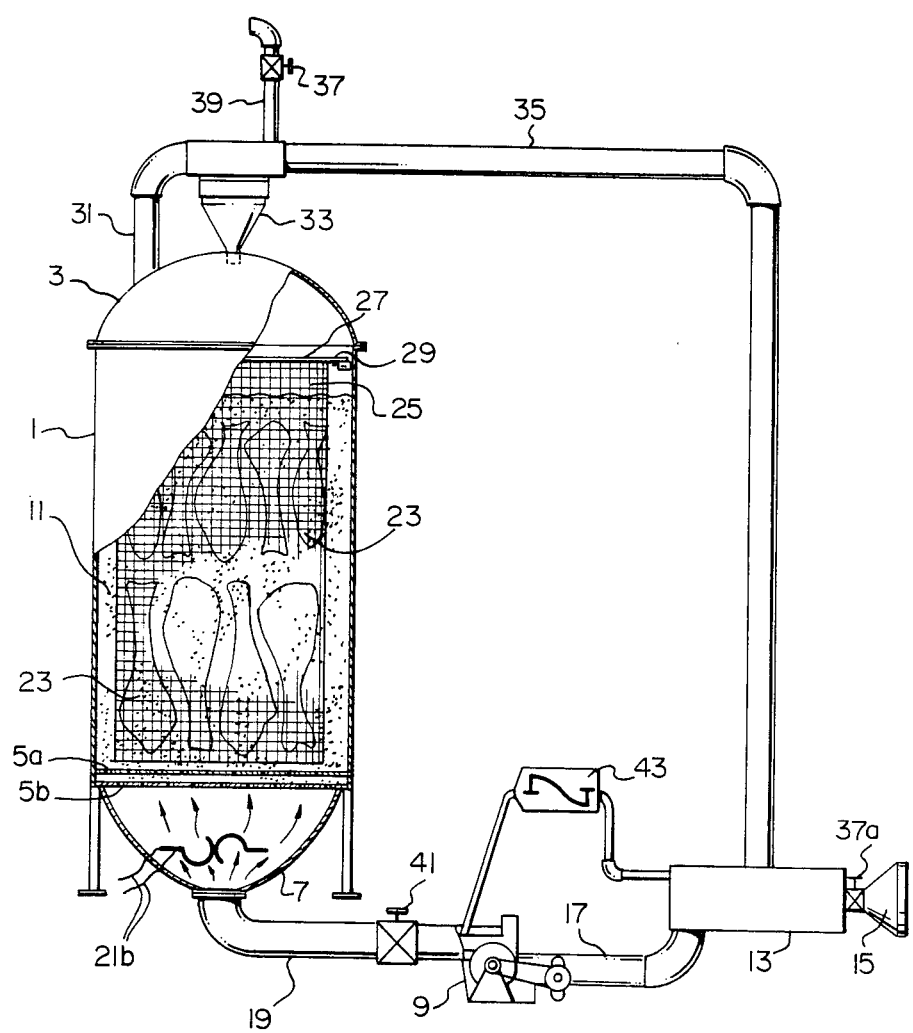
FIG. 2 is a simplified schematic vertical cross-sectional elevational view through the apparatus of the present invention, showing a rack of fish suspended in the fluidized salt bed within the chamber during the drying and salting process of the present invention.

At all times during the operation of the apparatus, salt particles contained in chamber 1 are maintained in a fluidized state by air forced through a double-plate diffuser which constitutes the floor of the chamber. As seen in FIG. 2, the two separate plates 5a and 5b which define the bottom of chamber 1 are provided with a plurality of apertures to allow the passage of air through the bottom of the chamber. The apertures through plate 5a are laterally offset from those through plate 5b to prevent salt from getting into the air plenum reservoir 7 directly below diffusion plates 5a and 5b. The relationship between the spacing between plates 5a and 5b and the areal extent of the apertures through those plates is designed to produce a baffling effect, so that air pumped under a positive pressure into plenum chamber 7 by compression pump 9 is diffused over the top surface 5a while providing a sufficient upward thrust to maintain salt bed 11 in a fluidized state.

With reference to the drawings, the operation of the apparatus of the present invention during the salting and drying of split fish suspended within chamber 1 is as follows:

Compressor pump 9 draws ambient air into air drying equipment 13 through air intake port 15. The dried air then passes through outlet 17 communicating with the intake of compressor pump 9 and exits the pump under a positive pressure, via connecting conduit 19 into plenum chamber 7. Prior to passage through the apertured bottom of chamber 1 supporting the salt bed, the dried air from compression pump 9 is heated by a heating element which may be located within connecting pipe 19, as shown at 21a in FIG. 1 or, alternatively within air plenum chamber 7 as shown at 21b in FIG. 2.

The heated dried air passes upwardly through salt bed 11 where it tends to keep the fine salt particles in an agitated state and the fluidized bed in constant motion.

As seen in FIG. 2, split fish 23 are vertically suspended between the two wire mesh faces 25 of a rack 27. Each such rack is preferably of two-piece construction and folds up from the bottom. Each rack is also provided with projections 29 remote from the folding axis of the rack adapted for engagement with and suspension from driven roller chains (not shown) near the top of the chamber.

The cover 3 of chamber 1 is recessed at the ends thereof to provide slots 31a and 31b whereby a rack of fish may be inserted through a slot at one end of the chamber at the commencement of the drying and salting process and removed from the slot at the other end of the chamber when the rack has been advanced the length of the chamber by the driven roller chains at the completion of the salting and drying process. Assuming that the direction of advancement of a rack suspended from the roller chains within chamber 1 is in the direction from slot 31a to slot 31b, one fish rack at a time is inserted into entry slot 31a and suspended from the roller chain of the conveying means within chamber 1. After the first rack has been suspended onto the roller chain through entry slot 31a it is moved forward toward exit slot 31b by a distance equal to about twice the thickness of a rack and a second rack is inserted. This charging process continues until the chamber is fully charged with racks of fish, at which stage the first rack of fish inserted into chamber 1 will have advanced to the end position within the chamber, whence it may be removed through exit slot 31b when it has received the desired treatment through exposure to salting and drying conditions within fluidized bed 11. Between such times as slot 31a and slot 31b are being employed for the introduction or removal of a fish rack, slots 31a and 31b may be occluded to prevent loss of salt from the fluidized bed.

In the salting and drying of fish in the preferred embodiment of the present invention it is important that between either mesh wall of rack 27 and the fish supported between mesh walls 25, there be interposed a layer of a moisture-permeable protective material, e.g. cloth. Alternatively, each split fish may be individually wrapped in a piece of such material. This not only assists the process of diffusion that effects salting of the fish, but is necessary to prevent the fish from being eroded away by the salt particles of the fluidized bed 11 in which they are completely immersed. The mesh 25 of rack 27 may be fabricated of 1/16 inch stainless steel or aluminum mesh. The interior walls of the closed rack present a plurality of small inward projections or "spikes" which grip the split fish and prevent them from falling to the bottom of the rack interior. However, it is important that the fish not be positively squeezed between the mesh faces of the rack as this would adversely affect the quality of the ultimate product. Lateral pressure tends to produce a thinner salt fish product having lower commercial value.

During the operation of the fluidized bed salt dryer unit, air which has passed through salt bed 11 into cover 3 is vented through air exhaust conduit portion 31 which is in communication with the interior of cover 3. The air which has passed through the salt bed may contain salt particles which can be reclaimed by the passage of the vented air through a salt reclamation unit comprising a cyclone separator 33 communicating with the interior of cover 3 and in tangential communication with air exhaust conduit portion 31, as shown in FIG. 2. The tangential entry of air into the top of cyclone separator 33 sets up a circular flow that retards the velocity of the salt laden air at that point and so precipitates a large part of any salt particles borne by the vented air down into the funnel shaped bottom of cyclone 33 to re-enter chamber 1. The vented air, substantially freed of residual entrained salt particles, then passes from the salt reclamation section through conduit 35 which communicates with air drying equipment 13, thereby completing the cyclical flow path.

Of course, the recycling of the air is not necessary for the practice of the invention: the fluidized bed could be operated entirely by fresh air drawn into the impelling means, the air leaving the chamber being simply exhausted to the atmosphere. Alternatively, a controllable fraction of the air leaving the chamber may be exhausted via vent 39, controlled by damper 37, and a corresponding amount of make-up air may be admitted to air drying equipment 13 via intake 15, controlled by damper 37a, the operation of which is preferably coordinated with the operation of damper 37 to maintain constant operating conditions and air volume flow.

The apparatus may be so constructed that the range of adjustment of the dampers 37 and 37a permits any fraction of the air from 0% to 100% to be exhausted to the atmosphere, so that any desired proportion of recycling of the air may be selected.

The volume of air flow through salt bed 11 within chamber 1 is confined within the relatively narrow range over which the salt particles will possess the properties of a fluidized bed. Volume flow conditions are controlled by adjustment of dampers 37 and 37a and by pressure control damper 41 located within connecting conduit 19 and interposed between compression pump 9 and air plenum chamber 7.

Further to the reclamation of salt from air that has passed through the fluidized bed, cyclone separator 33 presents the advantage of removing minor fragments of fish, scales and like debris which, being lighter than the salt particles, tend to be driven to the top of the fluidized bed and thence out into the cylcone collecting portion.

In order to monitor the conditions of temperature humidity and pressure at locations at either end of salt bed 11, hygrometers, pressure gauges and thermometers (not shown) are located at appropriate positions within plenum chamber 7, chamber 1 and cover portion 3.

Optionally, there may be associated with the apparatus an ozone generator, as shown at 43 in FIG. 2, or a smoke generator or both. The output of dryer 13 may be directed between one or both of these units to assist in directing ozone or smoke into the system. Ozone has been found to be useful in speeding up the curing process which takes place during the salting and drying of fish and produces a final product with a visual appearance and taste similar to salted fish produced by known methods. The split fish in this system may be exposed to a controlled amount of smoke to assist in imparting desirable colour and taste characteristics.

While the foregoing detailed description refers to the simultaneous drying and salting of fish in the form of split fish, fish fillets, shaped portions of minced fish, or whole fish, the same apparatus and method may, as has been previously mentioned, be utilized for the drying of wet salted fish, e.g. split fish or fillets that have pickled in brine.

While a specific embodiment has been described and shown, this is illustrative only and is not intended to limit the scope of the invention which is defined by the appended claims.

What is claimed is:

1. A method of drying and salting fish in the form of split fish, fish fillets, shaped portions of minced fish, or whole fish, comprising the steps of:
    (a) washing and draining said fish;
    (b) wrapping the fish in fabric material permeable to water;
    (c) arranging said fish with suitably exposed surfaces one next to another in two or more apertured enclosures;
    (d) establishing a fluidized bed of salt particles in a gaseous working fluid within a chamber operative to receive successively at one end thereof a series of said apertured enclosures for vertical suspension within said fluidized bed, said chamber being provided along its interior with means for horizontally advancing apertured enclosures suspended within said chamber through said fluidized bed to the other end of said chamber, where said apertured enclosures are successively removed;
    (e) suspending a first apertured enclosure containing wrapped fish within said chamber at one end thereof so that salt particles within a fluidized bed of salt particles can impinge on a substantial portion of the surface of said wrapped fish in said last-mentioned apertured enclosure when such enclosure holding said wrapped fish is immersed within said fluidized salt bed and advancing said enclosure through said chamber sufficiently to permit the suspension of a second apertured enclosure;
    (f) suspending a second apertured enclosure within said chamber at said one end thereof so that salt particles within a fluidized bed of salt particles can impinge on a substantial portion of the surface of said wrapped fish in said last-mentioned apertured enclosure when such enclosure holding said wrapped fish is immersed within said fluidized salt bed and continuing with the advancement of enclosures through said fluidized salt bed to the other end of said chamber and the introduction of subsequent apertured enclosures into said one end of said chamber until said chamber is fully charged with apertured enclosures of wrapped fish;
    (g) maintaining said enclosures within said chamber until the desired degree of treatment of the fish within said first apertured enclosure has been achieved.
    (h) removing said first enclosure and advancing the remaining enclosures suspended within the chamber one position towards said other end thereof;
    (i) successively removing apertured enclosures from the chamber in the order of their introduction into said chamber by repeated steps similar to step (h), so that each enclosure of wrapped fish has undergone a similar degree of treatment within said fluidized salt bed.

2. A method of drying fish in the form of wet, salted split fish or fish fillets, comprising the steps of:
    (a) washing and draining said fish;
    (b) wrapping the fish in fabric material permeable to water;
    (c) arranging said fish with suitably exposed surfaces one next to another in two or more apertured enclosures;
    (d) establishing a fluidized bed of salt particles in a gaseous working fluid within a chamber operative to receive successively at one end thereof a series of said apertured enclosures for vertical suspension within said fluidized bed, said chamber being provided along its interior with means for horizontally advancing apertured enclosures suspended within said chamber through said fluidized bed to the other end of said chamber, where said apertured enclosures are successively removed;
    (e) suspending a first apertured enclosure containing wrapped fish within said chamber at one end thereof so that salt particles within a fluidized bed of salt particles can impinge on a substantial portion of the surface of said wrapped fish in said last-mentioned apertured enclosure when such enclosure holding said wrapped fish is immersed within said fluidized salt bed and advancing said enclosure through said chamber sufficiently to permit the suspension of a second apertured enclosure;

(f) suspending a second apertured enclosure within said chamber at said one end thereof so that salt particles within a fluidized bed of salt particles can impinge on a substantial portion of the surface of said wrapped fish in said last-mentioned apertured enclosure when such enclosure holding said wrapped fish is immersed within said fluidized salt bed and continuing with the advancement of enclosures through said fluidized salt bed to the other end of said chamber and the introduction of subsequent apertured enclosures into said one end of said chamber until said chamber is fully charged with apertured enclosures of wrapped fish;

(g) maintaining said enclosures within said chamber until the desired degree of treatment of the fish within said first apertured enclosure has been achieved;

(h) removing said first enclosure and advancing the remaining enclosures suspended within the chamber one position towards said other end thereof;

(i) successively removing apertured enclosures from the chamber in the order of their introduction into said chamber by repeated steps similar to step (h), so that each enclosure of wrapped fish has undergone a similar degree of treatment within said fluidized salt bed.

3. A method as defined in claim 1 or claim 2, wherein said fluidized bed of salt particles is established by a generally upward flow through said salt particles of gaseous working fluid passing through said chamber, wherein said working fluid is introduced into said chamber, flows through said salt particles, and is then exhausted from said chamber, and wherein said working fluid is heated and dried prior to being introduced into said chamber.

4. A method as defined in claim 1 or claim 2, wherein said fluidized bed of salt particles is established by a generally upward flow through said salt particles of gaseous working fluid passing through said chamber, wherein said working fluid is introduced into said chamber, flows through said salt particles, and is then exhausted from said chamber, the passage of working fluid through said chamber being effected by fluid impelling means on the exhaust side of said chamber, and wherein said working fluid is heated and dried prior to being introduced into said chamber.

5. A method as defined in claim 1 or claim 2, wherein said fluidized bed of salt particles is established by a generally upward flow through said salt particles of gaseous working fluid passing through said chamber, wherein said working fluid is introduced into said chamber, flows through said salt particles, and is then exhausted from said chamber, the passage of working fluid through said chamber being effected by fluid impelling means on the intake side of said chamber, and wherein said working fluid is heated and dried prior to being introduced into said chamber.

6. A method as defined in claim 1 or claim 2, wherein said working fluid after leaving said chamber passes through means for the separation and recovery of entrained salt particles therefrom.

7. A method as defined in claim 1 or claim 2, wherein said working fluid after leaving said chamber passes through means for the separation and recovery of entrained salt particles therefrom, and wherein at least a part of said working fluid after passing through said salt particle separation and recovery means, is conducted through heating and drying means and is subsequently re-introduced into said chamber, the remaining part of said working fluid passing through said salt particle separation and recovery means being exhausted to the atmosphere.

8. A method as described in claim 1 or claim 2, wherein said gaseous working fluid is air.

9. A method as described in claim 5, wherein said gaseous working fluid is air.

10. A method as described in claim 6, wherein said gaseous working fluid is air.

11. A method as described in claim 1 or claim 2, wherein said gaseous working fluid comprises air and ozone.

12. A method as described in claim 5, wherein said gaseous working fluid comprises air and ozone.

13. A method as described in claim 6, wherein said gaseous working fluid comprises air and ozone.

14. A method as defined in claim 1 or 2, wherein said fish are arranged in parallel longitudinal arrangement within said apertured enclosures, so that said fish are generally perpendicularly disposed to the direction of movement of said enclosures through said chamber.

15. A method as defined in claim 5 wherein said fish are arranged in parallel longitudinal arrangement within said apertured enclosures, so that said fish are generally perpendicularly disposed to the direction of movement of said enclosures through said chamber.

16. A method as defined in claim 6 wherein said fish are arranged in parallel longitudinal arrangement within said apertured enclosures, so that said fish are generally perpendicularly disposed to the direction of movement of said enclosures through said chamber.

17. A method as defined in claim 1 or 2, further comprising the step of press piling said fish by arranging them in a stack of parallel horizontal layers after their removal from said fluidized bed of salt particles to increase the uniformity of moisture distribution through said stack of fish.

18. A method as defined in claim 5, further comprising the step of press piling said fish by arranging them in a stack of parallel horizontal layers after their removal from said fluidized bed of salt particles to increase the uniformity of moisture distribution through said stack of fish.

19. A method as defined in claim 6, further comprising the step of press piling said fish by arranging them in a stack of parallel horizontal layers after their removal from said fluidized bed of salt particles to increase the uniformly of moisture distribution through said stack of fish.

* * * * *